United States Patent
Nagaraja et al.

(10) Patent No.: US 9,538,065 B2
(45) Date of Patent: Jan. 3, 2017

(54) SYSTEM AND METHOD FOR MULTI-FOCUS IMAGING

(71) Applicant: QUALCOMM Incorporated, San Diego, CA (US)

(72) Inventors: Adarsh Hosaagrahara Nagaraja, San Diego, CA (US); Weiliang Liu, San Diego, CA (US); Shizhong Liu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/244,595

(22) Filed: Apr. 3, 2014

(65) Prior Publication Data

US 2015/0288870 A1 Oct. 8, 2015

(51) Int. Cl.
*H04N 5/232* (2006.01)
*G06K 9/46* (2006.01)
*H04N 5/235* (2006.01)

(52) U.S. Cl.
CPC ............ *H04N 5/23212* (2013.01); *G06K 9/46* (2013.01); *H04N 5/2356* (2013.01); *H04N 5/23216* (2013.01); *H04N 5/23219* (2013.01); *H04N 5/23293* (2013.01); *G06K 2009/4666* (2013.01)

(58) Field of Classification Search
CPC .. H04N 5/23212; H04N 5/23293; G06K 9/46; G06K 2009/4666
See application file for complete search history.

(56) References Cited

U.S. PATENT DOCUMENTS

| | | | |
|---|---|---|---|
| 6,975,352 B2 | 12/2005 | Seeger et al. | |
| 7,711,259 B2 | 5/2010 | Daley | |
| 8,154,647 B2 | 4/2012 | Ferren | |
| 2007/0126919 A1 | 6/2007 | Lee | |
| 2009/0059061 A1* | 3/2009 | Yu et al. | 348/347 |
| 2011/0267530 A1 | 11/2011 | Chun et al. | |
| 2012/0120269 A1 | 5/2012 | Capata et al. | |
| 2012/0120277 A1* | 5/2012 | Tsai | H04N 5/23293 348/223.1 |
| 2014/0092272 A1* | 4/2014 | Choi | H04N 5/23293 348/222.1 |

OTHER PUBLICATIONS

International Search Report and Written Opinion—PCT/US2015/022418—ISA/EPO—Jun. 15, 2015.

* cited by examiner

*Primary Examiner* — Mekonnen Dagnew
(74) *Attorney, Agent, or Firm* — Knobbe, Martens, Olson & Bear LLP (57) ABSTRACT

Systems and methods for multi-focus imaging are disclosed. An imaging system may suggest multiple regions of interest to a user based on a preview mode of a scene of interest. The user may select a plurality of the suggested regions of interest for a multi-focus image. The imaging system calculates the autofocus parameters for each of the multiple regions of interest and captures single images of each of the regions of interest when the shutter button of the camera is pressed. The imaging system then generates a multi-focus image from the multiple images.

27 Claims, 4 Drawing Sheets

SYSTEM AND METHOD FOR MULTI-FOCUS IMAGING

BACKGROUND

Field of the Invention

The systems and methods disclosed herein relate generally to multi-focus imaging.

Description of the Related Art

To take high quality images with a camera, the exposure and focus levels should be well adjusted to the objects within the scene of interest. However, in many circumstances, it can be difficult to obtain an optimal exposure and focus level for all objects within the scene. For example, it may be difficult to maintain objects in focus that are scattered at different distances along an axis (commonly the z-axis) defining the screen depth that extends from the camera lens to infinity. The depth of field is typically the area of the z-axis in which objects of the scene of interest are in focus. When the camera lens is zoomed in, the depth of field is shallower than when the camera lens is zoomed out. For this reason, it can be difficult to maintain focus on several objects located at different positions along the depth of field z-axis.

SUMMARY

The systems, methods and devices of the disclosure each have several innovative aspects, no single one of which is solely responsible for the desirable attributes disclosed herein. Combinations of the innovations, aspects and features described herein can be incorporated in various embodiments of systems, methods, and devices and such combinations are not limited by the examples of embodiments described herein.

Embodiments and innovations described herein relate to systems and methods that may be run in a processor for an electronic device for obtaining an image having multiple, in focus, regions of interest. An intuitive user experience is presented to allow the user to focus on different areas at different depths within the scene within a single image.

In some embodiments, the camera is selected and pointed at a scene containing multiple regions of interest (ROIs). The autofocus mechanism begins running and a number of ROIs may be suggested to the user in an image preview. These ROIs may be determined using various known methods, including but not limited to (a) face detection, (b) object tracking, or (c) direct user input. The user may select multiple ROIs during preview by touching or pinching the screen to select and adjust a desired selection. Based on the user's touch, the autofocus calculates the parameters for each region of interest and stores this information.

In some embodiments, when the user presses the shutter button to capture the image, multiple images are captured based on the number of ROIs selected (or, equivalently, the number of autofocus parameters calculated and stored). Each of the multiple images contains one of the ROIs in focus. A single image is then generated from the multiple images, the single image appearing as seamlessly formed from the multiple images. The resulting single image contains all of the multiple regions of interest in focus.

One aspect relates to a system for suggesting multiple regions of interest within a scene and generating a multi-focus image from the multiple regions of interest. The system includes a control module configured to determine candidate regions of interest within a scene, indicate suggestions of regions of interest from the possible regions of interest within a scene on a display screen, receive input indicating selection of multiple regions of interest, determine autofocus parameters associated with each of the selected multiple regions of interest, capture an image of each region of interest using the autofocus parameters associated with the region of interest, and generate a multi-focus image that includes image data from the image that includes each region of interest. The system may further include an imaging device including a sensor wherein the control module is configured to capture an image of each region of interest using the imaging device and the autofocus parameters associated with the region of interest. The control module may be further configured to operate the imaging device in a preview mode. The control module may be further configured to graphically display the suggested multiple regions of interest to the user in the preview mode. The control module may be further configured to determine the regions of interest within a scene using a face detection algorithm or an object tracking algorithm. The control module may be further configured to receive input regarding determining candidate regions of interest within a scene. The imaging device may further include a touchscreen, and the control module may be further configured to receive input indicating a selection of multiple regions of interest by registering a touch event on the touchscreen. The system may further include a mobile device wherein the control module may be a component of a camera application of the mobile device.

In another aspect, a method for suggesting multiple regions of interest within a scene and generating a multi-focus image from the multiple regions of interest includes the steps of determining candidate regions of interest within a scene, indicating suggestions of regions of interest from the possible regions of interest within a scene on a display screen, receiving input regarding selection of multiple regions of interest, determining autofocus parameters associated with each of the selected multiple regions of interest, capturing an image of each region of interest using the autofocus parameters associated with the region of interest, and generating a multi-focus image that includes image data from the image that includes each region of interest. The method may further include the step of operating an imaging device in a preview mode. In some embodiments, determining candidate regions of interest within a scene further includes performing one or more of face detection and object tracking on faces or objects within the scene. The method may further include the step of graphically displaying the suggested multiple regions of interest to the user in the preview mode. In some embodiments, accepting user input regarding selection of the multiple regions of interest further includes registering a touch event on a touchscreen of the imaging device. In some embodiments, the imaging device is configured to operate as part of a camera application for a mobile device.

In yet another aspect, an apparatus for suggesting multiple regions of interest within a scene and generating a multi-focus image from the multiple regions of interest, includes means for determining candidate regions of interest within a scene, means for suggesting multiple regions of interest from the possible regions of interest within a scene to a user, means for accepting user input regarding selection of the multiple regions of interest, means for determining autofocus parameters associated with each of the multiple regions of interest, means for capturing a single image of each region of interest using the autofocus parameters associated with the region of interest, and means for generating a single multi-focus image from the single image of each region of interest. The apparatus may further include means for operating an imaging device in a preview mode. In some embodiments, the means for determining candidate regions of interest within a scene further includes means for performing one or more of face detection and object tracking on faces or objects within the scene. In some embodiments, the apparatus may further include means for graphically displaying the suggested multiple regions of interest to the user in the preview mode. In some embodiments, the means for accepting user input regarding selection of the multiple regions of interest further includes means for registering a touch event on a touchscreen of the imaging device.

In another aspect, a non-transitory computer-readable medium stores instructions that, when executed, cause at least one physical computer processor to perform a method of suggesting multiple regions of interest within a scene and generating a multi-focus image from the multiple regions of interest. The method includes the steps of determining multiple possible or candidate regions of interest within a scene, suggesting multiple regions of interest from the possible regions of interest within a scene to a user, accepting user input regarding selection of the multiple regions of interest, determining autofocus parameters associated with each of the multiple regions of interest, capturing a single image of each region of interest using the autofocus parameters associated with the region of interest, and generating a single multi-focus image from the single image of each region of interest. In some embodiments, the method includes the step of operating an imaging device in a preview mode. In some embodiments, determining multiple possible or candidate regions of interest within a scene further includes performing one or more of face detection and object tracking on faces or objects within the scene. In some embodiment, the method further includes the step of graphically displaying the suggested multiple regions of interest to the user in the preview mode. In some embodiments, accepting user input regarding selection of the multiple regions of interest further includes registering a touch event on a touchscreen of the imaging device. In some embodiments, the imaging device is configured to operate as part of a camera application for a mobile device.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Typically, cameras in smart devices, such as cell phones, tablets, or other mobile devices, cannot clearly image capture objects at different depths. Most current devices cannot capture and focus on multiple objects of interest in a single image. Some cameras may be directed to focus on multiple objects of interest at different depths but the lens position to acquire this image "compromises" the focus of each object in the scene of interest rather than producing a single image with all of the objects of interest in focus. The methods and systems discussed below provide solutions to obtain a single, focused image of multiple objects located at different depths of focus.

In some embodiments, the proposed multi-focus imaging process directs a processor to suggest a number of regions of interest to the user during a preview mode. These suggestions may be made based on face detection, object tracking, or other feature or object identifying methods. The user may select one or more regions of interest to be included in the final multi-focus image. The processor then calculates the autofocus parameters for each region of interest and stores this information. When the user presses the shutter button to capture the image, multiple images are captured based on the number of ROIs selected (or, equivalently, the number of autofocus parameters calculated and stored). Each of the multiple images desirably contains one of the ROIs in focus. A single image is then generated from the multiple images, the single image appear as seamlessly formed from the multiple images. The resulting single image desirably contains all of the multiple regions of interest in focus.

It is noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Embodiments may be implemented in System-on-Chip (SoC) or external hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

System Overview

Figure 1:
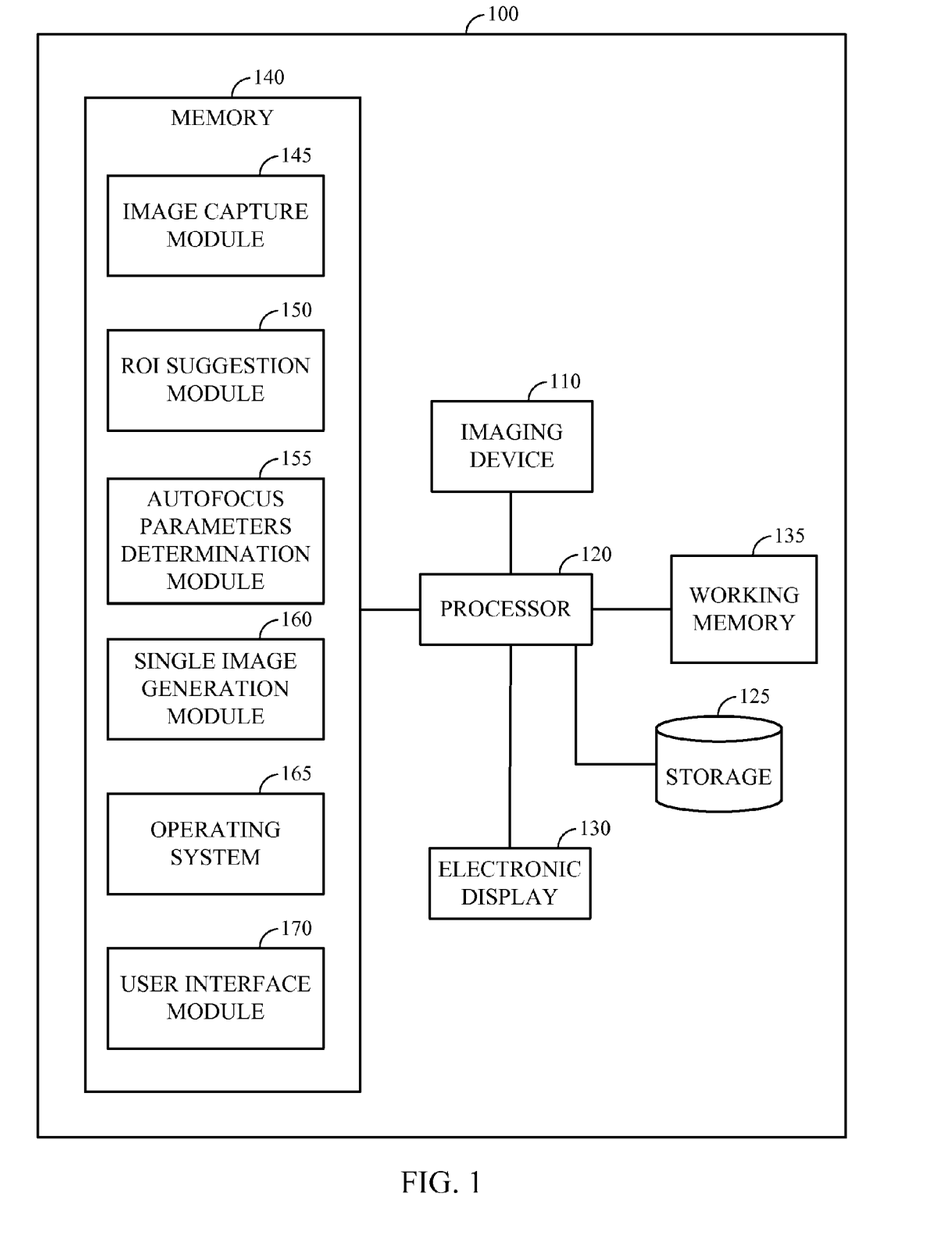
FIG. 1 is a block diagram depicting a system implementing some operative elements for obtaining an image having multiple, in focus, regions of interest.

FIG. 1 illustrates one example of an imaging system 100 configured to obtain a single image having multiple, in focus, regions of interest. The illustrated embodiment is not meant to be limiting, but is rather illustrative of certain components in some embodiments. System 100 may include a variety of other components for other functions which are not shown for clarity of the illustrated components.

The imaging system 100 may include an imaging device 110 and an electronic display 130. Certain embodiments of electronic display 130 may be any flat panel display technology, such as an LED, LCD, plasma, or projection screen.

Electronic display 130 may be coupled to the processor 120 for receiving information for visual display to a user. Such information may include, but is not limited to, visual representations of files stored in a memory location, software applications installed on the processor 120, user interfaces, and network-accessible content objects.

Imaging device 110 may employ one or a combination of imaging sensors. The imaging system 100 can further include a processor 120 linked to the imaging device 110. A working memory 135, electronic display 130, and program memory 140 are also in communication with processor 120. The imaging system 100 may be a mobile device, such as a tablet, laptop computer, or cellular telephone.

Processor 120 may be a general purpose processing unit or it may be a processor specially designed for imaging applications for a handheld electronic device. As shown, the processor 120 is connected to, and in data communication with, program memory 140 and a working memory 135. In some embodiments, the working memory 135 may be incorporated in the processor 120, for example, cache memory. The working memory 135 may also be a component separate from the processor 120 and coupled to the processor 120, for example, one or more RAM or DRAM components. In other words, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. The processor instructions may then be loaded into RAM to facilitate execution by the processor. For example, working memory 135 may be a RAM memory, with instructions loaded into working memory 135 before execution by the processor 120.

In the illustrated embodiment, the program memory 140 stores an image capture module 145, a region of interest (ROI) suggestion module 150, an autofocus parameters determination module 155, a single image generation module 160, operating system 165, and a user interface module 170. These modules may include instructions that configure the processor 120 to perform various image processing and device management tasks. Program memory 140 can be any suitable computer-readable storage medium, such as a non-transitory storage medium. Working memory 135 may be used by processor 120 to store a working set of processor instructions contained in the modules of memory 140. Alternatively, working memory 135 may also be used by processor 120 to store dynamic data created during the operation of imaging system 100.

As mentioned above, the processor 120 may be configured by several modules stored in the memory 140. In other words, the process 120 can run instructions stored in modules in the memory 140. Image capture module 145 may include instructions that configure the processor 120 to obtain images from the imaging device. Therefore, processor 120, along with image capture module 145, imaging device 110, and working memory 135, represent one means for obtaining image sensor data of one or more regions of interest.

Still referring to FIG. 1, memory 140 may also contain ROI suggestion module 150. The ROI suggestion module 150 may include instructions that configure the processor 120 to suggest regions of interest to the user, using face detection, object tracking, or other algorithms, and to display the regions of interest to the user on electronic display 130 during a preview mode of the imaging device 110, as will be described in further detail below. Therefore, processor 120, along with ROI suggestion module 150, working memory 135, and electronic display 130 represent one means for suggesting and showing one or more regions of interest to a user electronic device.

Memory 140 may also contain autofocus parameters determination module 155. The autofocus parameters determination module 155 may include instructions that configure the processor 120 to perform an autofocus function and calculate and store the autofocus parameters for each of the identified regions of interest. For example, if three regions of interest are selected, the processor 120 may be instructed by the autofocus parameters determination module 155 to calculate the autofocus parameters corresponding to each of region of interest and store the autofocus parameters in the working memory 135 or storage device 125. The processor 120 then can be instructed by the image capture module 145 to, using the imagine device 110, capture single images of each region of interest based on the autofocus parameters of each region of interest. Therefore, processor 120, along with ROI suggestion module 150, autofocus parameters determination module 155, and working memory 135 represent one means for calculating and storing autofocus parameters for each selected region of interest.

Memory 140 may also contain a single image generation module 160. The single image generation module 160 illustrated in FIG. 1 may include instructions that configure the processor 120 to generate a single, multi-focus image containing the multiple regions of interest identified by the ROI suggestion module 150. For example, if three regions of interest are selected, autofocus parameters are calculated and stored for each region of interest, and multiple images are taken in which each region of interest in focus in one of the multiple images, the processor 120 may be instructed by the single image generation module 160 to generate a single, multi-focus image by seamlessly integrating the multiple images. Therefore, processor 120, along with ROI suggestion module 150, single image generation module 160, and working memory 135 represent one means for generating a single image from multiple images of regions of interest.

Memory 140 may also contain user interface module 170. The user interface module 170 illustrated in FIG. 1 may include instructions that configure the processor 120 to provide a collection of on-display objects and soft controls that allow the user to interact with the device, such as allowing the user to select regions of interest identified and displayed in a preview mode of the imaging device. The user interface module 170 also allows applications to interact with the rest of the system. An operating system module 165 may also reside in memory 140 and operate with processor 120 to manage the memory and processing resources of the system 100. For example, operating system 165 may include device drivers to manage hardware resources such as the electronic display 130 or imaging device 110. In some embodiments, instructions contained in the ROI suggestion module 150 and autofocus parameters determination module 155 may not interact with these hardware resources directly, but instead interact through standard subroutines or APIs located in operating system 165. Instructions within operating system 165 may then interact directly with these hardware components.

Processor 120 may write data to storage module 125. While storage module 125 is represented graphically as a traditional disk drive, those with skill in the art would understand multiple embodiments could include either a disk-based storage device or one of several other types of storage mediums, including a memory disk, USB drive, flash drive, remotely connected storage medium, virtual disk driver, or the like.

Although FIG. 1 depicts a device comprising separate components to include a processor, imaging device, electronic display, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 1 illustrates two memory components, including memory component 140 comprising several modules and a separate memory 135 comprising a working memory, one with skill in the art would recognize several embodiments utilizing different memory architectures. For example, a design may utilize ROM or static RAM memory for the storage of processor instructions implementing the modules contained in memory 140. Alternatively, processor instructions may be read at system startup from a disk storage device that is integrated into imaging system 100 or connected via an external device port. The processor instructions may then be loaded into RAM to facilitate execution by the processor. For example, working memory 135 may be a RAM memory, with instructions loaded into working memory 135 before execution by the processor 120.

Method Overview

Embodiments of the invention relate to a process for multi-focus imaging, which can include recommending a plurality of candidate regions of interest within a single scene of interest to the user, receiving input regarding determining candidate region of interest within a scene, receiving input as to the selection of the desired regions of interest to be captured within the single scene, obtaining multiple images based on autofocus parameters associated with the desired or selected regions of interest, and seamlessly integrating the multiple images into a single, multi-focus image. That is, for example, a single image that has multiple regions at different object planes (or depths), each of which are in-focus in the integrated image. The examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Figure 2:
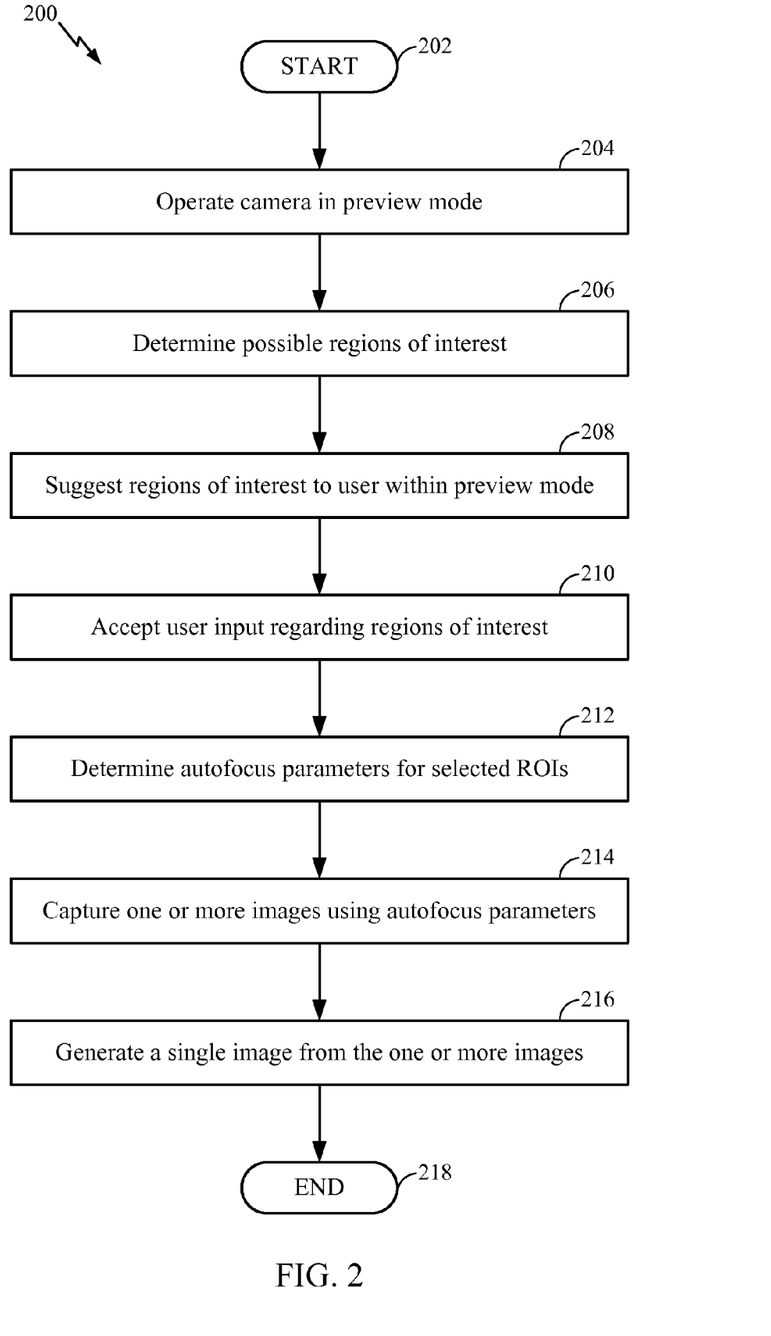
FIG. 2 is a flow chart illustrating a process for obtaining an image having multiple, in focus, regions of interest.

FIG. 2 illustrates one embodiment of a process 200 to configure an electronic device having an imaging device (such as imaging device 110 shown in FIG. 1) to perform multi-focus imaging that may be implemented in one or more of the modules depicted in FIG. 1. In some examples, the process 200 may be run on a processor, for example, processor 120 (FIG. 1), and on other components illustrated in FIG. 1 that are stored in memory 140 or that are incorporated in other hardware or software.

The process 200 begins at start block 202 and transitions to block 204 wherein the imaging device 110 is operated in a preview mode. In some embodiments, a preview mode may include displaying on an electronic display, for example, electronic display 130 (FIG. 1) the scene as viewed by the lens of the imaging device 110. The electronic device may be a handheld communication device, e.g., a cellular phone or "smartphone," or a mobile personal data assistant (PDA) including a tablet computer. For example, the user may operate the camera of a mobile device in a preview mode to determine whether or not to capture an image. In another example, the user may operate the camera of the mobile device in a preview mode to determine what regions of interest the user would like to capture in a multi-focus image.

The process 200 then transitions to block 206, wherein the processor, such as processor 120, is instructed to determine possible regions of interest within the current scene. In some embodiments, the processor may use face detection or object tracking to identify possible regions of interest. In one embodiment, a face detection algorithm, for example, the OMRON™ face detection algorithm may be used. However, the system as described is preferably insensitive to the face detection algorithm used as long as the selected algorithm is able to detect faces and outputs an accurate region of interest (ROI) window around the detected faces. In some embodiments, the object tracking algorithm could be similar to one used in touch to track (T2T) use cases developed on QUALCOMM Inc.'s Snapdragon™ processor.

In one example, face detection may determine that three faces appear at various depths within the scene. In another example, object tracking might identify two or more items within a scene, for example, a pail, sand castle, and a bird on a beach. Once the possible regions of interest have been determined, process 200 transitions to block 208.

Figure 3:
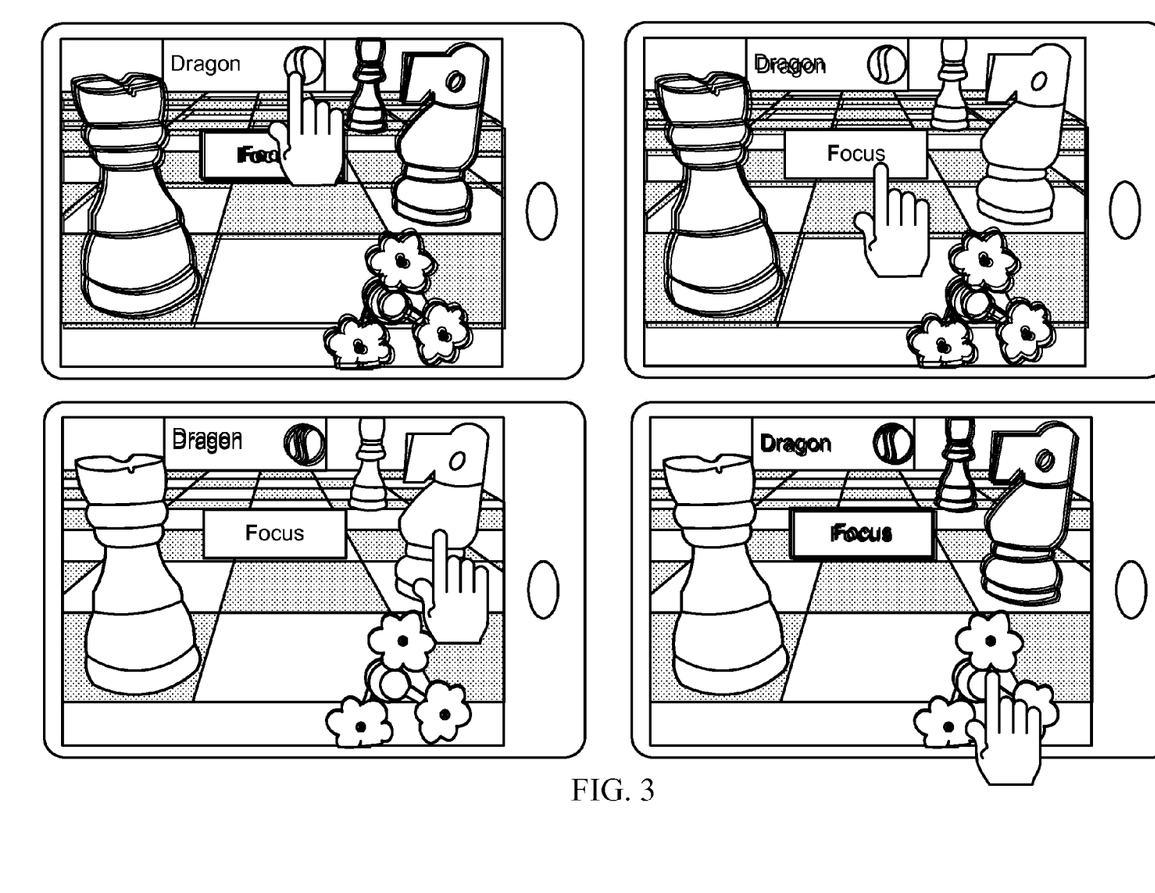
FIG. 3 is an example of a user interface depicting suggestions for regions of interest of focus and user selected regions of interest.

In block 208, the processor is instructed to suggest regions of interest to the user and display these regions of interest in the preview mode of the imaging device. To continue the examples discussed above, if the processor detects a plurality of faces within the scene, such as the three faces at different scene depths, the processor could be instructed to indicate each face as a possible region of interest by displaying a rectangle, circle, brackets, or other indicator around each face. The size of the region of interest may depend on whether the ROI is suggested by the system or the ROI is selected by the user. If the ROI is suggested by the system, for example, through a face detection or object detection operation, the ROI window will be the shape, such as rectangle, circle, ellipse, etc. that can fully contain the suggested object. In some embodiments, the ROI could be a rectangle drawn around the face. In some embodiments, the size of the ROI could be as small as a few pixels or a large as a full display screen depending on the area of the image occupied by the detected ROI. In some embodiments, if the ROI is selected by the user, the ROI could be a rectangle or other shape of a fixed size. In other embodiments, the user could indicate an ROI by selecting two or more points surrounding the ROI to define a shape surrounding the ROI. In another example, the processor could be instructed to display a pointer or a hand indicator at each face or region of interest in order to clearly indicate these possibilities for multi-focus imaging to the user. Process 200 next transitions to block 210, wherein the processor is instructed to accept user input regarding one or more regions of interest. For example, for an electronic device configured with a touchscreen, the user may select one or more of the faces displayed in a preview mode by selecting each face on the touchscreen. The user may also use a mouse, pointer, or button to select a plurality of regions of interest. One example of a user interface illustrating a user selecting multiple regions of interest is shown in FIG. 3. As shown in FIG. 3, the user may direct a pointer to each of the multiple regions of interest. In this example, the user has selected the "Focus" text, the "Dragon" text, the knight chess piece, and the flowers.

Process 200 next transitions to block 212, wherein the processor is instructed to determine autofocus parameters related to the selected ROIs. In some embodiments, the processor may be instructed to perform an autofocus function of the imaging device 110 to determine the autofocus parameters such that each of the selected regions of interest is in focus. The autofocus parameters are the set of commands sent to a sensor driver of the processor 120. The sensor driver includes settings or instructions to move the lens position of the imaging device 110. In some embodiments, the sensor driver could include parameters to adjust the autofocus, auto white balance, and auto exposure settings of the imaging device 110. The autofocus parameters are preferably determined by the underlying autofocus, auto white balance, and auto exposure settings algorithm and may be based on the imaging device 100. For example, the autofocus function could calculate the autofocus parameters for each of the faces identified as regions of interest within the scene and selected by the user as desired regions of interest for a multi-focus image. Process 200 next transitions to block 214, wherein the processor is instructed to capture one or more images, each image containing one of the regions of interest in focus, using the autofocus parameters associated with each region of interest. For example, a separate image may be captured of each of the three faces identified as regions of interest by the user.

Figure 4:
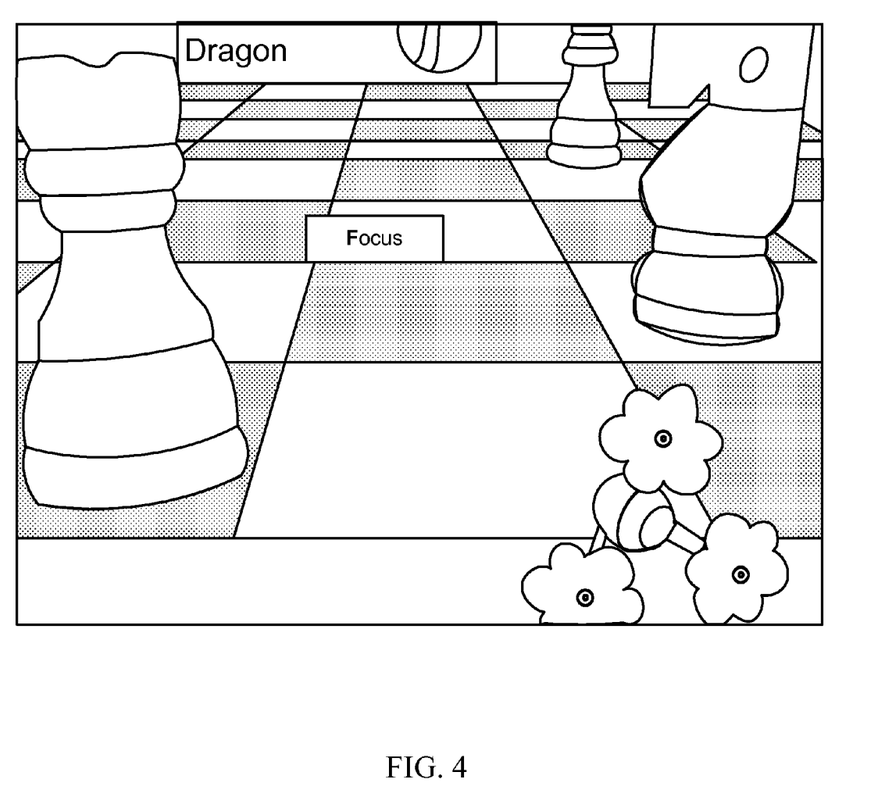
FIG. 4 is an example of a multi-focus image having multiple regions of focus.

Process 200 then transitions to block 216, wherein the processor is instructed to generate a single image from the one or more images captured of the multiple regions of interest. One example of multi-focus single image is shown in FIG. 4. In this illustration, the regions of interest selected as shown in FIG. 3 are displayed in focus in the single image shown in FIG. 4. A single image may be generated by combining two or more images captured by the imaging device 110 as discussed above and "stitching" the images together using any known image combining algorithm. For example, a single image may be acquired by applying image alignment, image registration, and image blending techniques as known in the art to the two or more images captured by the imaging device 110 with different focus settings. After the single image is generated, process 200 transitions to block 218 and ends.

Clarifications Regarding Terminology

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

Those having skill in the art will further appreciate that the various illustrative logical blocks, modules, circuits, and process steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. One skilled in the art will recognize that a portion, or a part, may comprise something less than, or equal to, a whole. For example, a portion of a collection of pixels may refer to a sub-collection of those pixels.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or process described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary computer-readable storage medium is coupled to the processor such the processor can read information from, and write information to, the computer-readable storage medium. In the alternative, the storage medium may be integral to the processor. The processor and the storage medium may reside in an ASIC. The ASIC may reside in a user terminal, camera, or other device. In the alternative, the processor and the storage medium may reside as discrete components in a user terminal, camera, or other device.

Headings are included herein for reference and to aid in locating various sections. These headings are not intended to limit the scope of the concepts described with respect thereto. Such concepts may have applicability throughout the entire specification.

The previous description of the disclosed implementations is provided to enable any person skilled in the art to make or use the present invention. Various modifications to these implementations will be readily apparent to those skilled in the art, and the generic principles defined herein may be applied to other implementations without departing from the spirit or scope of the invention. Thus, the present invention is not intended to be limited to the implementations shown herein but is to be accorded the widest scope consistent with the principles and novel features disclosed herein.

What is claimed is:

1. A system for suggesting multiple regions of interest within a scene and generating a multi-focus image from the multiple regions of interest, comprising:
   a touchscreen display;
   a memory component;
   a control module comprising one or more processors, the control module configured to
      determine candidate regions of interest within a scene;
      indicate suggestions of the candidate regions of interest on the display;
      receive input from the display indicating a selection of multiple regions of interest from the regions of interest indicated on the display;
      determine autofocus parameters associated with each of the selected multiple regions of interest, including performing autofocus to determine the autofocus parameters for each selected region of interest where the selected region of interest is in focus;
      store the autofocus parameters in the memory component;
      after receiving from a user an input to capture images, capture an image of each region of interest using the stored autofocus parameters associated with the region of interest; and
      generate a multi-focus image that includes image data from the image that includes each region of interest.

2. The system of claim 1, further comprising an imaging device comprising a sensor, wherein the control module is configured to capture an image of each region of interest using the imaging device and the autofocus parameters associated with the region of interest.

3. The system of claim 2, wherein the control module is further configured to operate the imaging device in a preview mode.

4. The system of claim 3, wherein the control module is further configured to graphically display the suggested regions of interest to the user in the preview mode.

5. The system of claim 2, wherein the control module is further configured to receive input indicating a selection of multiple regions of interest by registering a touch event on the touchscreen.

6. The system of claim 1, wherein the control module is further configured to determine the regions of interest within a scene using a face detection algorithm or an object tracking algorithm.

7. The system of claim 1, wherein the control module is further configured to receive input regarding determining candidate regions of interest within a scene.

8. The system of claim 1, further comprising a mobile device wherein the control module is a component of a camera application of the mobile device.

9. A method for suggesting multiple regions of interest within a scene and generating a multi-focus image from the multiple regions of interest, comprising:
   receiving digital image data of a scene;
   determining candidate regions of interest within the scene;
   indicating suggestions of the candidate regions of interest on a display screen;
   receiving input indicating selection of multiple regions of interest from the regions of interest indicated on the display;
   determining autofocus parameters associated with each of the selected multiple regions of interest, wherein determining autofocus parameters includes performing autofocus to determine the autofocus parameters for each selected region of interest where the selected region of interest is in focus;
   storing the autofocus parameters in a memory component;
   after receiving an input to capture images, capturing an image of each region of interest using the stored autofocus parameters associated with the region of interest; and
   generating a multi-focus image that includes image data from the image that includes each region of interest.

10. The method of claim 9, further comprising operating an imaging device in a preview mode.

11. The method of claim 10, further comprising graphically displaying the suggested multiple regions of interest to the user in the preview mode.

12. The method of claim 10, wherein the imaging device is a component of a camera application of a mobile device.

13. The method of claim 9, further comprising determining regions of interest within a scene using a face detection algorithm or an object tracking algorithm.

14. The method of claim 9, wherein receiving input indicating selection of multiple regions of interest further comprises registering a touch event on a touchscreen.

15. An apparatus for suggesting multiple regions of interest within a scene and generating a multi-focus image from the multiple regions of interest, comprising:
   means for determining candidate regions of interest within a scene;
   means for indicating suggestions of the candidate regions of interest on a display screen;
   means for receiving input from the display indicating a selection of multiple regions of interest;
   means for determining autofocus parameters associated with each of the selected multiple regions of interest, wherein determining autofocus parameters includes performing autofocus to determine the autofocus parameters for each selected region of interest where the selected region of interest is in focus;
   means for storing the autofocus parameters in a memory component;
   means for capturing an image of each region of interest using the stored autofocus parameters associated with the region of interest; and
   means for generating a multi-focus image that includes image data from the image that includes each region of interest.

16. The apparatus of claim 15, further comprising an imaging device comprising a sensor, wherein the apparatus further comprises means for capturing an image of each region of interest using the imaging device and the autofocus parameters associated with the region of interest.

17. The apparatus of claim 16, further comprising means for operating the imaging device in a preview mode.

18. The apparatus of claim 17, further comprising means for graphically displaying the suggested multiple regions of interest to the user in the preview mode.

19. The apparatus of claim 15, further comprising means for determining the regions of interest within a scene using a face detection algorithm or an object tracking algorithm.

20. The apparatus of claim 15, further comprising a touchscreen, and wherein the apparatus further comprises means for receiving input indicating a selection of multiple regions of interest by registering a touch event on the touchscreen.

21. The apparatus of claim 15, further comprising means for receiving input regarding determining candidate regions of interest within a scene.

22. A non-transitory computer-readable medium storing instructions that, when executed, cause at least one physical computer processor to perform a method comprising:
   determining candidate regions of interest within a scene;
   indicating suggestions of the candidate regions of interest on a display;
   receiving input from the display indicating a selection of multiple regions of interest;
   determining autofocus parameters associated with each of the selected multiple regions of interest, wherein determining autofocus parameters includes performing autofocus to determine the autofocus parameters for each selected region of interest where the selected region of interest is in focus;
   storing the autofocus parameters in memory;
   receiving an input indicating to capture images;
   after receiving the input, capturing an image of each region of interest using the stored autofocus parameters associated with the region of interest; and
   generating a multi-focus image that includes image data from the image that includes each region of interest.

23. The non-transitory computer-readable medium of claim 22, wherein the method further comprises operating an imaging device in a preview mode.

24. The non-transitory computer-readable medium of claim 23, wherein the method further comprises graphically displaying the suggested regions of interest to the user in the preview mode.

25. The non-transitory computer-readable medium of claim 22, wherein the method further comprises determining the regions of interest within a scene using a face detection algorithm or an object tracking algorithm.

26. The non-transitory computer-readable medium of claim 22, wherein the method further comprises receiving input regarding determining candidate regions of interest within a scene.

27. The non-transitory computer-readable medium of claim 22, further comprising receiving input indicating a selection of multiple regions of interest by registering a touch event on a touchscreen.

* * * * *